H. D. PRATT.
MACHINE FOR HANDLING GRANULAR MATERIAL.
APPLICATION FILED JUNE 13, 1919.
1,320,090.                              Patented Oct. 28, 1919.
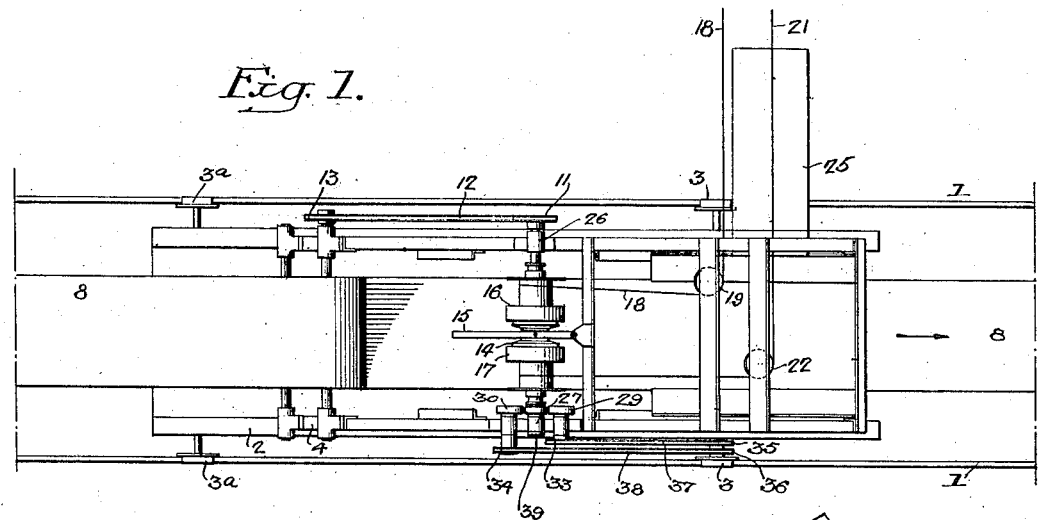
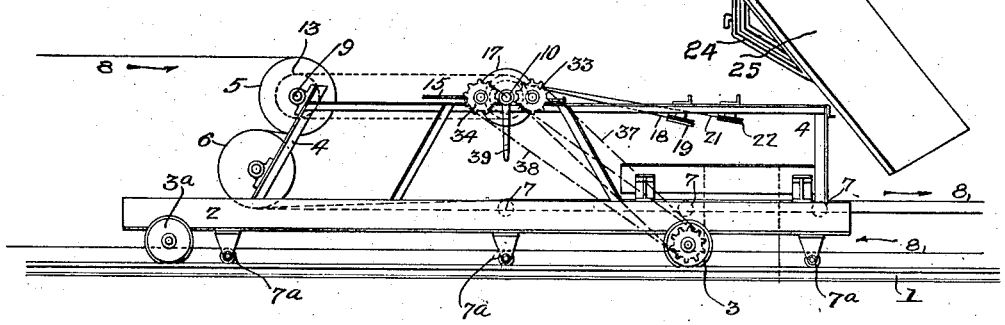
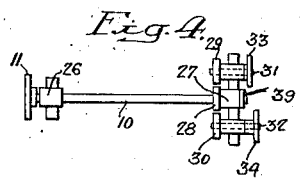
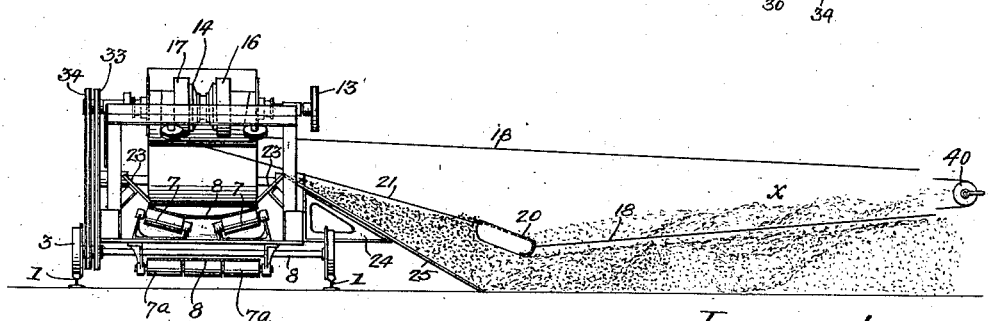
Inventor:
Howell D. Pratt,
by his Attorneys,
Howson & Howson

UNITED STATES PATENT OFFICE.

HOWELL D. PRATT, OF PHILADELPHIA, PENNSYLVANIA, ASSIGNOR TO LINK-BELT COMPANY, OF CHICAGO, ILLINOIS, A CORPORATION OF ILLINOIS.

MACHINE FOR HANDLING GRANULAR MATERIAL.

1,320,090.      Specification of Letters Patent.      Patented Oct. 28, 1919.

Application filed June 13, 1919. Serial No. 303,856.

*To all whom it may concern:*

Be it known that I, HOWELL D. PRATT, a citizen of the United States, residing in Philadelphia, Pennsylvania, have invented certain Improvements in Machines for Handling Granular Material, of which the following is a specification.

One object of my invention is to provide a simple and effective means for handling granular material so as to deliver material from a pile onto a conveyer which, in turn, carries the material to any point of discharge.

A further object of the invention is to provide means for traversing the mechanism along the length of the conveyer so that the material of a comparatively long pile can be removed by a scoop and discharged onto a conveyer.

In the accompanying drawings:

Figure 1 is a plan view of my improved loading apparatus for handling granular material;

Fig. 2 is a side view;

Fig. 3 is an end view illustrating a pile of material and the action of the scoop;

Fig. 4 is an enlarged sectional view showing eccentric means for shifting the shaft;

Fig. 5 is a detached view of the detachable bracket; and

Fig. 6 is a view illustrating a modification in which the pulley is arranged to travel on a rail.

1, 1 are two rails which extend along the edge of a pile of sand, or other granular material $x$. On these rails is a carriage 2 having flanged wheels 3, $3^a$, mounted on axles having their bearings on the carriage. On the carriage 2 is a frame 4, which may be of any form desired. On this frame are bearings for shafts 9 and $9^a$ carrying the belt drums 5 and 6 respectively. On the carriage are rollers 7 arranged at an angle to the center line through the belt 8 so as to support the belt and also to form it into the shape of a trough. The upper run of the belt travels in the direction of the arrow, Figs. 1 and 2. The belt 8 passes around the drum 5, then under the drum 5 and around the drum 6, the two drums being offset, as clearly shown in Fig. 2. This construction enables the carriage to be moved lengthwise of the belt to any position desired and the power of the belt can be utilized to drive the mechanism hereinafter described. The return run of the belt, as shown in Fig. 2, is carried by rolls $7^a$ mounted in hangers depending from the carriage 2.

I utilize the shaft 9 of the drum 5 as a power shaft for driving the mechanism, which I will now proceed to describe.

The belt 8 is driven from any suitable source of power. Mounted on the frame 4 is a transverse shaft 10 having a sprocket wheel 11 at one end around which passes a chain 12 from a sprocket wheel 13 on the shaft 9 of the belt drum so that when the belt is in motion power is transmitted to the shaft 10. Splined on the shaft 10 is a clutch sleeve 14 controlled by a lever 15 and arranged to be moved in contact with either of the drums 16 and 17, which are loosely mounted on the shaft. On the drum 16 is a rope 18, which passes around a guide pulley 19, in the present instance, and is directed to sheave 40 suitably anchored at the opposite side of the pile $x$ of material. This rope 18 is attached to the rear end of the scoop 20, as shown clearly in Fig. 3. A rope 21 is attached to the forward end of the scoop and is carried around the guide wheel 22 and onto the drum 17 so that when the clutch sleeve 13 is engaged with the drum 17, the scoop is moved forward and carries with it a certain amount of material, which is discharged onto the belt, and when the clutch sleeve 14 is in engagement with the drum 16 the scoop is drawn back to a position to receive another load.

Secured to the frame on either side of the belt 8 are guide plates 23. On one side of the frame are brackets 24 carrying an inclined plate 25 over which the granular material is carried by the scoop and discharged over one of the plates 23 and onto the belt 8. The brackets 24 are made detachable, as in Fig. 5, so that they can be located on either side of the carriage with the plate 25, depending upon the location of the pile of material $x$ in respect to the rails 1.

In order to traverse the carriage on the rails 1, as the scoop removes material from the pile, I provide means for driving the carriage from the shaft 10. The shaft 10 is mounted on a swivel bearing 26 at the end carrying the sprocket wheel 11 and is mounted in an eccentric bearing 27 at the opposite end. On this shaft is a friction wheel 28 adapted to engage either of the friction wheels 29 or 30 on the shafts 31 and 32 respectively. The shaft 31 carries a sprocket wheel 33 and the shaft 32 carries a sprocket wheel 34. On the axle 3 are two sprocket wheels 35 and 36. A chain belt 37 passes around the sprocket wheels 33 and 35 and a chain belt 38 passes around the sprocket wheels 34 and 36. The eccentric bearing 27 is turned by an arm 39 and shifts the friction wheel 28 into engagement with either of the wheels 29 or 30 so that, when it is desired to move the carriage forward, the eccentric is shifted in one direction, and when it is desired to reverse the movement of the carriage the eccentric is shifted in the opposite direction. Instead of the friction wheels, gear wheels may be used without departing from the essential features of the invention.

It will be understood that the pulley 40 around which the rope passes, is anchored at the opposite side of the pile from the machine. This anchor may be a post driven into the ground so that it can be withdrawn and moved forward as the machine is moved forward, or it may be mounted on a fixed rail so that the pulley can be traversed with the machine, as in Fig. 6. It is not absolutely necessary that the scoop should move in a direction at right angles to the belt, consequently, the carriage can be moved a considerable distance without altering the position of the anchor.

In operating my improved apparatus for handling granular material, the track 1, as hereinbefore stated, is located adjacent to a piling floor, so that the granular material, such as sand, &c., is placed on the floor at any height desired, and when it is wished to remove the sand from the floor all that is necessary is to place the anchor on the opposite side of the pile from the machine and thread the rope 18 around the pulley 40 and locate the inclined plate 25 on the pile side of the machine. When the machine is set in motion by the movement of the belt, the clutch can be thrown into gear with either drum by the attendant, and the scoop will be reciprocated over the pile, carrying with it, in one operation, the material from the pile, which is discharged onto the belt, and on its return movement it will pass over the material. When the movement is again reversed, it will carry another load to the belt.

I claim:

1. The combination in a traveling belt, of a carriage having drums around which the belt passes; a shaft driven from one of said drums; rope drums on said shaft; a clutch on the shaft arranged to engage either of the drums; ropes extending from the drums; and a scoop attached to the ropes and arranged to carry material from a pile and deliver it to the belt.

2. The combination of a track adjacent to a pile of material; a carriage on the track; a driven endless belt; drums on the carriage around which the belt passes; a shaft driven from one of said drums; a clutch sleeve mounted so as to turn with the shaft; two drums loose on the shaft arranged to be engaged by the clutch sleeve; ropes passing from the drums and at an angle to the belt; a scoop attached to the ropes; one of said ropes passing around an anchor shaft on the opposite side of the material so that, on the movement of the clutch, the scoop can be reciprocated toward and from the belt in order to engage the material of the pile and deliver it to the belt.

3. The combination of a track; a carriage mounted on the track; an endless belt; drums on the carriage around which the belt passes; a shaft driven from one of the drums; a scoop driven from the shaft, one of the wheels of the carriage being a driving wheel; means, driven by the shaft, for causing a movement of the said driving wheel; and means for throwing the shaft into engagement with the said means so as to move the carriage along its rails.

4. The combination of a track located adjacent to a pile of material; a carriage mounted on the track; an endless driven belt; drums on the carriage around which the belt passes; a transverse shaft on the carriage driven from one of said drums; a clutch sleeve arranged to slide on and turn with the shaft; two rope drums on the shaft, one on each side of the clutch sleeve; ropes passing from the drums and to one side of the carriage; a scoop to which the ropes are attached; an anchored sheave around which one of the ropes passes; an inclined plate at one side of the carriage so that on the movement of the clutch a reciprocating motion can be imparted to the scoop to carry material from the pile up the inclined plate and discharge it onto the belt.

5. The combination of a track located at one side of a pile of material; an endless driven belt running parallel with the track; a carriage mounted on the track; drums on the carriage around which the belt passes; a transverse shaft driven from one of said drums; said shaft having a clutch; ropes passing from the drums; a scoop to which the ropes are attached; said shaft being mounted in a swivel bearing at one end and an eccentric bearing at the opposite end;

means for turning the eccentric bearing; two shafts, one on each side of the said eccentrically mounted shaft; means connecting the shaft with one of the axles of the carriage so that the carriage will be driven; and friction gear wheels on the eccentrically mounted shaft and on the side shafts so that when the eccentric is shifted in one direction, one of the side shafts will be driven, and when the eccentric is shifted in the opposite direction the other side shaft will be driven so that the carriage can be moved along the edge of the pile.

HOWELL D. PRATT.